United States Patent
Braun et al.

(10) Patent No.: US 10,528,558 B2
(45) Date of Patent: *Jan. 7, 2020

(54) PROCESSING A DATABASE QUERY IN A DATABASE SYSTEM

(71) Applicant: International Business Machines Corporation, Armonk, NY (US)

(72) Inventors: Florian Braun, Stuttgart (DE); Andreas Brodt, Gerlingen (DE); Daniel Martin, Stuttgart (DE); Oliver Schiller, Dettingen (DE)

(73) Assignee: International Business Machines Corporation, Armonk, NY (US)

( * ) Notice: Subject to any disclaimer, the term of this patent is extended or adjusted under 35 U.S.C. 154(b) by 335 days.

This patent is subject to a terminal disclaimer.

(21) Appl. No.: 15/607,807

(22) Filed: May 30, 2017

(65) Prior Publication Data

US 2017/0262500 A1    Sep. 14, 2017

Related U.S. Application Data

(63) Continuation of application No. 14/919,777, filed on Oct. 22, 2015, now Pat. No. 9,934,272.

(51) Int. Cl.
*G06F 16/2453* (2019.01)
*G06F 16/21* (2019.01)
(Continued)

(52) U.S. Cl.
CPC ...... *G06F 16/24534* (2019.01); *G06F 16/219* (2019.01); *G06F 16/24532* (2019.01); *G06F 16/24553* (2019.01); *G06F 21/76* (2013.01)

(58) Field of Classification Search
CPC . G06F 16/00; G06F 16/24534; H01L 21/8221
See application file for complete search history.

(56) References Cited

U.S. PATENT DOCUMENTS 7,921,130 B2   4/2011   Hinshaw et al.
8,468,151 B2   6/2013   Branscome et al.
(Continued)

OTHER PUBLICATIONS

U.S. Appl. No. 15/607,807, filed May 30, 2017.
(Continued)

*Primary Examiner* — Etienne P Leroux
(74) *Attorney, Agent, or Firm* — Michael A. Petrocelli

(57) ABSTRACT

A method for processing a database query on a database system includes receiving the database query at the database system, determining a sequence of database operations for processing the database query, estimating a number of incoming data elements of the database system to be processed for each of the database operations, estimating a workload of a programmable integrated circuit of the database system for each of the database operations based on the estimated number of incoming data elements, assuming each of the database operations is performed in a single instantiation, selecting a number of instantiations $N_i$ for a database operation i of the sequence of database operations based on the estimated workload of the programmable integrated circuit for the database operation i, and configuring the programmable integrated circuit to execute the determined sequence of database operations, the database operation i is instantiated $N_i$ times.

8 Claims, 3 Drawing Sheets

(51) Int. Cl.
*G06F 16/2455* (2019.01)
*G06F 21/76* (2013.01)

(56) References Cited

U.S. PATENT DOCUMENTS

| | | | |
|---|---|---|---|
| 8,620,881 B2 | 12/2013 | Chamberlain et al. | |
| 9,934,272 B2* | 4/2018 | Braun | G06F 16/24534 |
| 10,176,147 B2* | 1/2019 | Samadi | H01L 21/8221 |
| 2014/0067851 A1* | 3/2014 | Asaad | G06F 16/00 707/769 |
| 2014/0181072 A1 | 6/2014 | Wong | |
| 2015/0046430 A1 | 2/2015 | Asaad et al. | |
| 2017/0116265 A1 | 4/2017 | Braun et al. | |

OTHER PUBLICATIONS

U.S. Appl. No. 14/919,777, filed Oct. 22, 2015, US 2017-0116265 A1.
IBM: List of IBM Patents or Patent Applications Treated As Related (Appendix P), Jun. 29, 2017, 2 pages.
Dennl et al., "Acceleration of SQL Restrictions and Aggregations through FPGA-based Dynamic Partial Reconfiguration", 2013 21st Annual International IEEE Symposium on Field-Programmable Custom Computing Machines, IEEE computer society, pp. 25-28.
Casper et al., "Hardware Acceleration of Database Operations", FPGA'14, Feb. 26-28, 2014, Monterey, CA, USA, pp. 151-160.
Jensen, "Reconfigurable FPGA Accelerator for Databases", University of Oslo, Master thesis, Aug. 1, 2012, 107 pages.
Majer et al., "The Erlangen Slot Machine: A Dynamically Reconfigurable FPGA-Based Computer ", J. VLSI Signal Process. Syst., vol. 47, No. 1, pp. 1-23, Apr. 2007.
Mueller et al., "Data Processing on FPGAs", VLDB '09, Aug. 24-28, 2009, Lyon, France, 12 pages.
Mueller et al., "FPGA: What's in it for a Database?", SIGMOD'09, Jun. 29-Jul. 2, 2009, Providence, Rhode Island, USA, pp. 999-1004.
Najafi et al., "Flexible Query Processor on FPGAs", Aug. 26-30, 2013, Riva del Garda, Trento, Italy, Proceedings of the VLDB Endowment, vol. 6, No. 12, 4 pages.
Teubner et al., "FPGA Acceleration for the Frequent Item Problem", ICDE Conference 2010, pp. 669-680, IEEE.

* cited by examiner

PROCESSING A DATABASE QUERY IN A DATABASE SYSTEM

BACKGROUND

The present invention generally relates to a method for processing a database query on a database system, and more particularly to a database system including a programmable integrated circuit that is operable to implement a plurality of database operations.

The performance of analytical database systems when processing database queries may be improved by exploiting programmable integrated circuits, like FPGAs, to offload parts of the query processing from the main processors of the database system. Such FPGAs may, for example, be used in query processing for decompression, transaction visibility filtering, simple selections and projecting required columns. This de-burdens the main processors from those early stages of query processing and decreases the amount of data that the central processing unit must process by a great deal.

Typically, a static configuration of the programmable integrated circuit in used may remain the same for all queries. Thus, the programmable integrated circuit always executes the same logic. The logic is only parameterized, for example, by the visible transaction window, the comparison values for the selections or the set of columns to project. The logic itself however does not anticipate the specific characteristics of a particular query.

SUMMARY

Disclosed herein is an improved method for processing a database query on a database system, a corresponding database system and a computer program product as specified in the independent claims. Embodiments of the invention are given in the dependent claims. Embodiments of the present invention may be freely combined with each other if they are not mutually exclusive.

In one aspect the invention relates to a method for processing a database query on a database system. The database system may include at least one programmable integrated circuit like an FPGA, the at least one programmable integrated circuit being operable to implement a plurality of database operations.

In a method step the method may include receiving the database query at the database system. Once the database query has been received a sequence of database operations for processing the database query may be determined. Per database operation of the sequence of database operations, a number of incoming data elements of the database system to be processed by the database operation may be estimated. Subsequently, the workload of the at least one programmable integrated circuit per database operation may be estimated using the respectively estimated number of data elements assuming the database operation would be performed in a single instantiation.

Once the workload has been estimated a number of instantiations Ni of the database operation i may be selected per database operation according to the respectively estimated workload per database operation i. In a method step, the at least one programmable integrated circuit may be configured for execution of the determined sequence of database operations, the database operation i being instantiated Ni times.

A "database system" as understood herein may be any kind of computer system including or being connected to mass data storage, the computer system including at least one central processing unit. In addition to the central processing unit the database system according to the present invention may further include a programmable integrated circuit like for example an FPGA (field programmable gate array). A programmable integrated circuit may be understood as an integrated circuit including an array of programmable logic blocks which may be customly wired together using reconfigurable interconnects. For example, the programmable integrated circuit may be configured using a hardware description language (HDL).

A "database query" as described herein may be a demand for a certain set of data elements or the result of an analysis of set of data elements, the database query including certain criteria or data processing steps which are to be carried out with the data elements included in the mass storage devices of the database system. To this end, a database query may, for example, be divided into individual data processing steps like the selection of a certain range of data elements from a plurality of data elements, the combination of data elements or the filtering of data elements. The processing of the data elements for these individual data processing steps may be carried out by database operations, each database operation processing a number of incoming data elements in accordance with the parameters specified in the database query. To this end, the programmable integrated circuit may be configured, for example, by reconfiguring the interconnects of the logic blocks inside the programmable integrated circuit in accordance with the database operations to be carried out for processing the database query using run time parameters of the database query.

Embodiments may have the advantage that the full potential of the programmable integrated circuit may be exploited as will be set forth in the following. Usually at least some of the database operations may change the number of data elements which have to be processed by the subsequent database operation in the sequence of database operations. For example a decompression operation may receive a single data element from the database system and produce five data elements out of this single data element. In a similar manner, a selection operation which drops all data elements which do not satisfy a certain predefined condition may reduce the number of data elements which are passed on to the next database operation.

Thus, if in a sequence of database operations, every database operation is instantiated only once it may occur that some of the database operations may have to process, for example, five times the data elements processed by the preceding database operation or may, for example, only have to process one third of the data elements which have been processed by the preceding database operation. Thus, some of the database operations may be over- or under-utilized. As a result, the full potential of the programmable integrated circuit may not be exploited as the over-utilized database operations may cause a bottleneck while the under-utilized database operations are not operating at full capacity. This however may be overcome with the method as described above as the number Ni of instantiations of each database operation I in the sequence of database operations is adapted to the estimated workload of each database operation when processing the database query. Thus, the utilization of each of the database operations may be balanced and optimized.

In some embodiments the database operations in the sequence of database operations form a data processing pipeline, the $N_i$ instantiations of database operation i being arranged as parallel operations in the data processing pipeline.

Embodiments may have the advantage that by forming a data processing pipeline the number of data elements which may be processed in a certain time period may be increased. Usually in a pipeline a data element which has been processed by a data operation may be forwarded to the subsequent data processing operation. Thus, with every step the data elements travel from one database operation to the next database operation. As a result, all the database operations may process database elements in parallel instead of having to wait for a single data element to pass through all database operations of the sequence of database operations. Further, by instantiating the $N_i$ instantiations of the database operations as parallel database operations, it is possible that, for example, in the case of a decompression operation, all the data elements produced by this database operation may be forwarded to the $N_i$ instantiations of the subsequent database operation in the sequence of database operations instead of having to forward only one data element at a time. Thus, it may be not necessary to insert buffer storages between the individual database operations.

In some embodiments, the processing of the incoming data elements by a database operation results in a number of outgoing data elements from the database operation. A repository may be assigned to the at least one programmable integrated circuit, the repository including configurations of the at least one programmable integrated circuit for implementation of the database operations in the at least one programmable integrated circuit. The repository may further include information assigned to these database operations, the information being indicative of a ratio of the number of incoming data elements to the number of outgoing data elements per database operation. In this case, estimating the number of incoming data elements per database operation may be conducted using the information successively for each database operation in the sequence of database operations.

For example, the repository may include the necessary configurations of the interconnects of the programmable logic blocks of the programmable integrated circuit, which may cause the integrated circuit to process incoming data elements as demanded by the specifications of the database operation to be implemented. Further, the repository may also include configurations for the parallel instantiation of a number of identical database operations. In order to configure the at least one programmable integrated circuit for the execution of the sequence of database operations it may be sufficient to look up the corresponding configuration from the repository and configure the at least one programmable integrated circuit accordingly. Further, the information on the expected ratio of the number of incoming data elements to the number of outgoing data elements may facilitate the estimation of the number of incoming data elements per database operation.

In some embodiments each database operation depends on the preceding database operation in the sequence of database operations.

In some embodiments processing of the incoming data elements by a database operation results in a number of outgoing data elements from the database operation. The configuration of the at least one programmable integrated circuit in this case may include the determination for the database operation i of the ratio $Q_i$ of the number of instantiations $N_i$ of database operation i to the number $N_{i+1}$ of instantiations of database operation i+1. Once the ratio $Q_i$ has been determined a data processing operation is inserted between the database operations i and i+1, the inserted data processing operation being adapted to distribute the number of outgoing data elements resulting from the $N_i$ instantiations of the database operation i to the $N_{i+1}$ instantiations of the database operation i+1 according to the ratio $Q_i$. This determination of the ratio $Q_i$ and insertion of the data processing operation between the database operations i and i+1 may preferably be carried out for all the combinations of adjacent database operations in the sequence of database operations.

Embodiments may have the advantage that the distribution of the data elements which are produced by a database operation to a subsequent database operation may be conducted by a dedicated data processing operation, which may be understood as a multiplexer or de-multiplexer. Thus, it may not be necessary to implement the distribution of the produced data elements within the database operations themselves thereby facilitating the implementation of the database operations.

In some embodiments the estimation of the workload of the at least one integrated circuit for database operation i may include determining the ratio $W_i$ of the estimated number of incoming data elements $r_{i-1}$ to be processed by database operation i−1 to the estimated number of data elements $r_i$ to be processed by database operation i the workload being scaled in accordance with the ratio Wi.

In some embodiments the selection of the number of instantiations $N_i$ of the database operation i may include defining a relative utilization $U_i$ of the database operation i as the product of the ratio $W_i$ and a ratio of the number of instantiations $N_{i-1}$ of the database operation i−1 to the number of instantiations $N_i$ of database operation i. Using this relative utilization $U_i$ the number of instantiations $N_i$ of the database operation i is varied such that the relative utilization $U_i$ satisfies a predefined threshold. For example, it may be defined that the relative utilization of a database operation should be close to 1 but never greater than 1. The relative utilization $U_i$ may be understood as a measure indicating whether a database operation is estimated to be over- or under-utilized. If the relative utilization $U_i$ of a database operation is greater than 1 the database operation may be assumed to be over-utilized while if the relative utilization $U_i$ of the database operation is less than 1 the database operation may be assumed to be under-utilized.

In accordance with a further embodiment it may also be possible to define the threshold as the relative utilization $U_i$ of the first database operation in the sequence of database operations as the first database operation may always form some sort of a bottleneck in the sequence of database operations.

In another aspect the invention relates to a database system for processing a database query the database system including at least one programmable integrated circuit and the at least one programmable integrated circuit being operable to implement a plurality of database operations. The database system may be adapted to:

receive the database query, determine a sequence of database operations for processing the database query, estimate a number of incoming data elements of the database system to be processed per database operation, estimate the workload of the at least one programmable integrated circuit per database operation using the respectively estimated number of incoming data elements assuming the database operation would be performed in a single instantiation, select per database operation a number of instantiations $N_i$ of the database operation i according to the respectively estimated workload per database operation i, and configure the at least one programmable integrated circuit for execution of the determined sequence of database operations the database operation i being instantiated $N_i$ times.

In yet another aspect the invention relates to a computer program product including machine-executable instructions for performing the method as described above.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Figure 1:
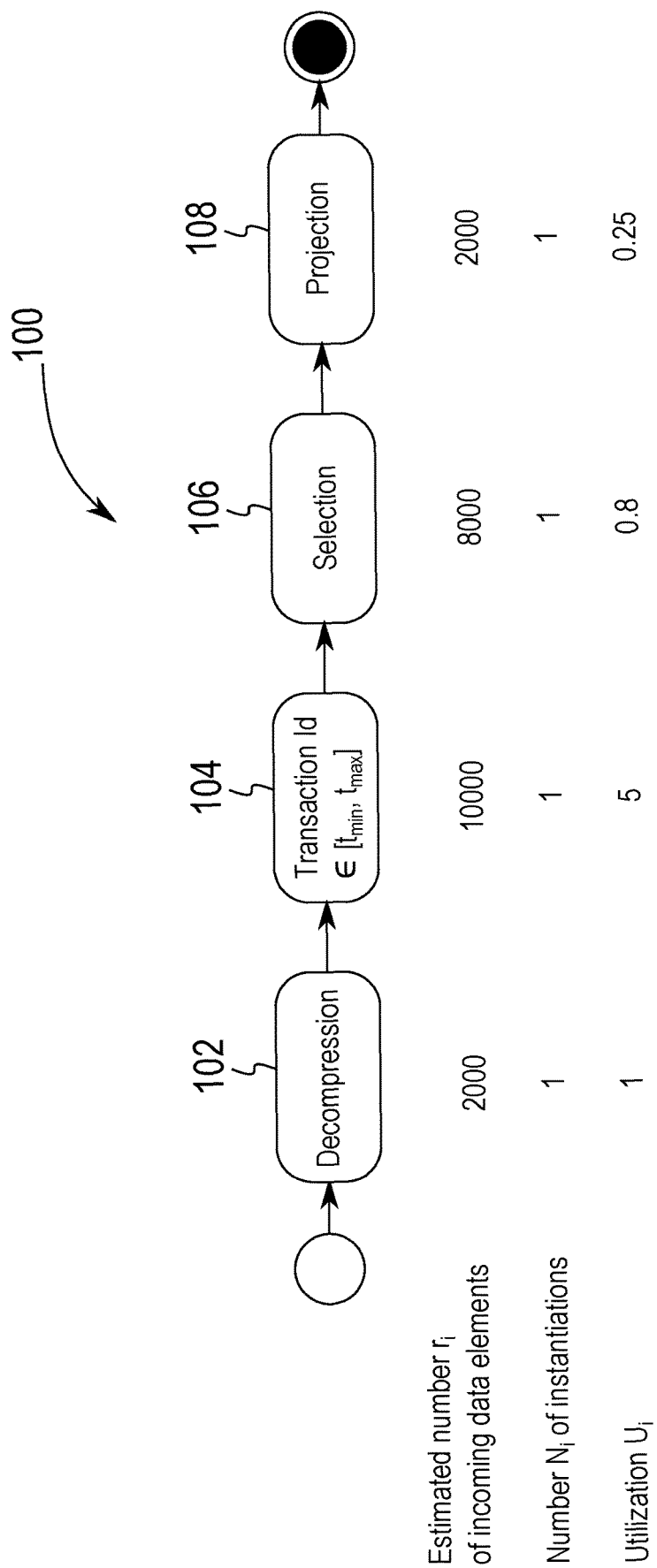
FIG. 1 depicts a sequence of database operations for processing a database query, according to an embodiment of the present disclosure.

Referring now to FIG. 1, a schematic of a sequence of database operations 100 for processing a database query is shown, according to an embodiment of the present disclosure. When a database query enters a database system a corresponding query planner usually produces a logical operation sequence, which in this case includes database operations for decompression of the data elements received from the database system 102, a database operation for filtering the data elements, in this case for a certain range of transaction IDs 104, a database operation for the selection of certain data elements 106 and a database operation for the projection of data elements 108. In the example depicted in FIG. 1, it is estimated that the first database operation 102 may receive 2,000 data elements from the database system when processing the database query which may be used as a starting value for a selectivity estimation of the remaining database operations.

Starting with the 2,000 data elements of the first database operation 102 it may be estimated that the second database operation 104 will receive 10,000 data elements after decompression of the 2,000 data elements of the first database operation 102 as the decompression of a single data element may produce 5 new data elements. The third database operation 106 may only receive 8,000 data elements from the second database operation 104 as the second database operation 104 may discard at least some of the data elements received from the first database operation 102 as they are not matching the predefined range of data elements. In the same way, the fourth database operation 108 is estimated to only receive 2,000 data elements as the third database operation 106 may, for example, discard 75% of the data elements received from the second database operation 104. Thus, the first database operation 102 may have to process approximately 2,000 data elements, the second database operation 104 may have to process approximately 10,000 data elements, the third database operation 106 may have to process approximately 8,000 data elements and the fourth and final database operation 108 may have to process approximately 2,000 data elements for processing the database query.

In the example depicted in FIG. 1 it is assumed that each of the database operations is instantiated only once ($N_i=1$). Using the estimated number $r_i$ of data elements to be processed per database operation i in combination with the initial number of instantiations $N_i$ of each database operation i, a relative utilization $U_i$ of the database operation i may be determined. For example the relative operator utilization $U_i$ may be determined using the following equation:

$$U_i = \begin{cases} \frac{r_i \times N_{i-1}}{r_{i-1} \times N_i}, & i > 0 \\ 1, & i = 0_i \end{cases}$$

This utilization $U_i$ may be understood as a measure for how many data elements a database operation may receive from the preceding database operation per data processing step. For example, in a single data processing step the first database operation 102 may create five data elements out of a single data element such that the second database operation 104 may have to process five data elements per data processing step. As the database operations are assumed to only be capable of processing a single data element per step and further assuming that the second database operation 104 may discard approximately 20% of the data elements received from the first database operation 102 only 0.8 data elements may be received by the third database operation 106 from the second database operation 104 per data processing step. In the same way the fourth database operation 108 may only receive 0.25 data elements from the third database operation 106 as the third database operation 106 may discard approximately 75% of the data elements received from the second database operation 104. Thus, the database operation 104 is estimated to be over-utilized ($U_i > 1$) while the third and fourth database operations 106 and 108 are assumed to be under-utilized ($U_i < 1$).

By definition the utilization $U_i$ of the first database operation 102 is assumed to be $U_0=1$ as there is no preceding database operation and thus the first database operation 102 may define the number of data elements which may be sent into the sequence of database operations per step.

Figure 2:
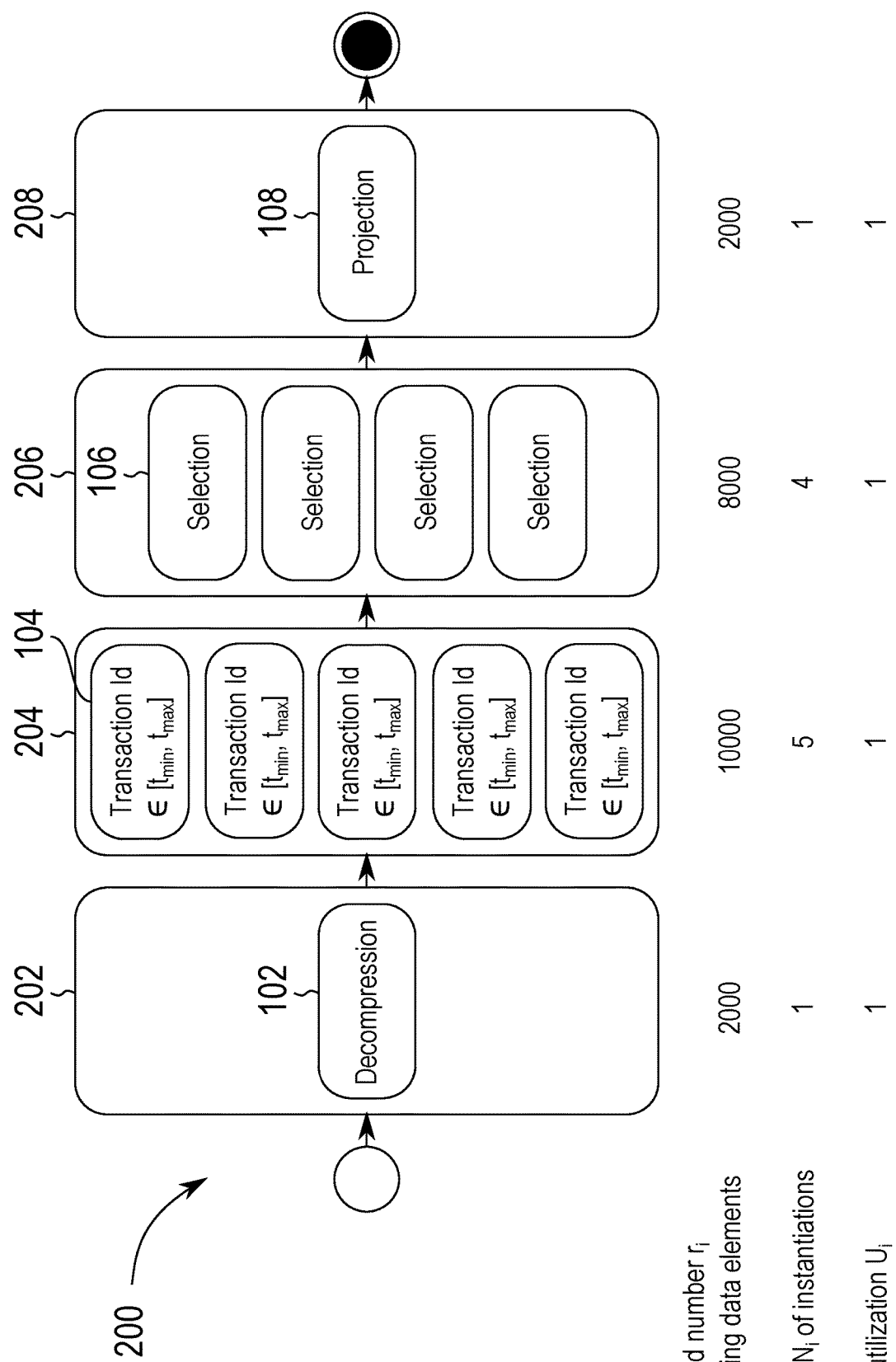
FIG. 2 depicts a sequence of database operations after multi-instantiation of the database operation for the same database query, according to an embodiment of the present disclosure.

Referring now to FIG. 2, a schematic of a substantially similar database query including the same sequence of database operations 200 but with multiple instantiations of some of the database operations is shown, according to an embodiment of the present disclosure. For processing the first database operation 102 in the sequence of database operations 202 a single instantiation of the first database operation 102 is sufficient as the utilization $U_i$ of the first database operation 102 has been determined to be 1 as described in FIG. 1.

However, the second database operation 204 in the sequence of database operations includes five instantiations of the database operation 104. This is because it has previously been determined that the second database operation 104 if only instantiated once has a relative utilization $U_i$ of $U_i$=5. Thus for processing the result of a single execution of the first database operation 102 it is necessary to instantiate five times the database operation 104 of the second database operation 204 in the sequence of database operations. As may be seen in FIG. 2 a result from these five instantiations of the second database operation 104 is that the relative utilization $U_i$ of the second database operation 204 has dropped to the value of 1. However, assuming that the third database operation 206 only included a single instantiation of the database operation 106 the relative utilization $U_i$ of the third database operation 206 would have been increased to 4 in accordance with the equation for the determination of the relative utilization $U_i$ described above. Thus to reduce the relative utilization $U_i$ of the third database operation 206 it is necessary to implement four instantiations of the third database operation 106.

As the third database operation 206 approximately discards 75% of the data elements received from the second database operation 204 it is sufficient to instantiate the fourth database operation 208 only once. As a result, the relative utilization of all four database operations 202, 204, 206 and 208 may be reduced or raised to a value of one. This means that for each data processing step all the data elements processed by one of the database operations 202, 204, 206 and 208 may be simultaneously processed by the subsequent database operation and thus the throughput of the database operation sequence has been maximized.

It has to be noted that in the initial determination of the utilization $U_i$ of the individual database operations i as described in FIG. 1 the relative utilization of for example the fourth database operation 108 has been determined to be 0.25. This means that with the initial determination of the utilization $U_i$, assuming that every database operation is instantiated only once, the fourth database operation 108 would have been under-utilized. However, in accordance with FIG. 2 the curing of the over-utilization of the database operations 204 and 206 the under-utilization of the fourth database operation 208 has been cured as well. Yet this is usually not the case leading to the necessity to both prevent the over-utilization of database operations and separately also prevent the under-utilization of database operations. A corresponding procedure for parallelizing a sequence of database operations is shown as algorithm 1 in the following:

Algorithm 1

```
1:   procedure Parallelize
2:      function CalculateUtilization(i)
3:         if i>0 then
4:            return (r_i × N_{i-1}) / (r_{i-1} × N_i)
5:         else
6:            return 1.0
7:         end if
8:      end function
9:      procedure PreventOverUtilization
10:        U_0 ← CalculateUtilization(0)
11:        N_0 ← 1
12:        for I ← 1...n-1 do
13:           N_i = 1
14:           U_i ← CalculateUtilization(i)
15:           if U_i > 1.0 then
16:              Ni ← [U_i]
17:              Ui ← U_i / N_i
18:           end if
19:        end for
20:     end procedure
21:     procedure PreventUnderUtilization
22:        for I ← n-1...1 do
23:           f ← [1 / U_i]
24:           if f > 1 then
25:              for j ← 0...i-1 do
26:                 N_j ← N_j * f
27:                 U_j ← CalculateUtilization(j)
28:              end for
29:           end if
30:           U_i ← CalculateUtilization(i)
31:        end for
32:     end procedure
33:     PreventOverUtilization
34:     PreventUnderUtilization
35:  end procedure
```

In order to show how the Algorithm 1 works a sequence of ten arbitrary database operations with operator numbers from 0-9 is assumed. A corresponding table describing the number of input data elements $r_i$, which is estimated for each of the database operations i as well as a corresponding number of instantiations $N_i$ and the corresponding relative operator utilization $U_i$ is given in Table 1 below.

TABLE 1

| Database Operatoration | Number of Incoming Data | Number of Instantiations (N) | Relative Op. Utilization (U) |
|---|---|---|---|
| 0 | 940 | 1 | 1.0000 |
| 1 | 190 | 1 | 0.2021 |
| 2 | 442 | 1 | 2.3263 |
| 3 | 291 | 1 | 0.6584 |
| 4 | 556 | 1 | 1.9107 |
| 5 | 302 | 1 | 0.5432 |
| 6 | 936 | 1 | 3.0993 |
| 7 | 787 | 1 | 0.8408 |
| 8 | 179 | 1 | 0.2274 |
| 9 | 511 | 1 | 2.8547 |
| 0 | 940 | 1 | 1.0000 |
| 1 | 190 | 1 | 0.2021 |
| 2 | 442 | 3 | 0.7754 |
| 3 | 291 | 2 | 0.9876 |
| 4 | 556 | 4 | 0.9553 |
| 5 | 302 | 3 | 0.7242 |
| 6 | 936 | 10 | 0.9300 |
| 7 | 787 | 9 | 0.9342 |
| 8 | 179 | 3 | 0.6823 |
| 9 | 511 | 9 | 0.9516 |
| 0 | 940 | 4 | 1.0000 |
| 1 | 190 | 1 | 0.8085 |
| 2 | 442 | 3 | 0.7754 |
| 3 | 291 | 2 | 0.9876 |
| 4 | 556 | 4 | 0.9553 |
| 5 | 302 | 3 | 0.7242 |
| 6 | 936 | 10 | 0.9300 |
| 7 | 787 | 9 | 0.9342 |
| 8 | 179 | 3 | 0.6823 |
| 9 | 511 | 9 | 0.9515 |

By executing the Algorithm 1, the necessary number of instantiations $N_i$ for every operator i is calculated such that the relative operator utilization $U_i$ is as high as possible but never greater than 1. In a first procedure the over-utilization of the database operations is addressed. The initial utilization is calculated for every database operation in pipeline order. The very first database operation may, by definition, not be over-utilized and is thus assigned a number of instantiations $N_0=1$. If it is determined that a database operation is over-utilized, its number of instantiations Ni is set to the value of its determined utilization $U_i$. The number of instantiations $N_i$ must be rounded up to the next integer number as there may be no fractional instances. Subsequently, the utilization $U_i$ of the database operations is recomputed which also affects the utilization of the following database operations in the next iteration. After all operators have been processed there may not be any over-utilization for the database operations in the sequence.

The result of the first procedure which is meant to prevent the over-utilization of database operators is shown in the second dataset of Table 1. Again, it has to be noted that by increasing the number of instantiations $N_i$ at an over-utilized database operation i the relative utilization $U_i$ of the following operation is by definition increased as well. This may lead to an over-utilization of the database operation i+1. As the database operations are processed in pipeline order the database operation i+1 is dealt with next. However, the increased number of instantiations Ni may also reduce under-utilization at the database operation i+1. Thus, it is quite possible that after removing over-utilization the under-utilization of the database operations has been removed as well as has already been described above with reference to FIG. 2.

In a subsequent procedure the remaining under-utilization is addressed. This time the sequence of database operations is processed in reversed pipeline order. Under-utilization is dealt with by increasing the number of instantiations $N_i$ of all preceding database operations. That is why processing is stopped at the second database operation as the first database operation with i=0 does not have any preceding database operations and is by definition never under-utilized.

First an adjustment factor f which equals the inverse of the utilization $U_i$ is computed. The factor f must be rounded down to the next integer number as rounding up might lead to over-utilization of database operation i. If the adjustment factor f is greater than 1 the necessary number of instantiations $N_i$ of all preceding database operations in pipeline order is multiplied with the factor and their utilization is recalculated. Note that this may introduce a plurality of instantiations $N_0$ in the first operator as well. This may for example be possible by processing multiple input data streams in parallel.

Due to potentially different numbers of instantiations $N_i$ the output of a database operation i may not be simply passed on to the following database operation i+1. Between every pair of adjacent database operations with different numbers of instantiations $N_i$ a multiplexer or de-multiplexer is necessary which is capable of adapting the $N_{i-1}$ output streams of data elements into $N_i$ input streams of data elements. It is both possible to implement this (de-) multiplexing in the database operations themselves as well as introducing dedicated data processing operations between the database operations capable of attributing the flow of data elements between the individual instantiations of the database operations.

Figure 3:
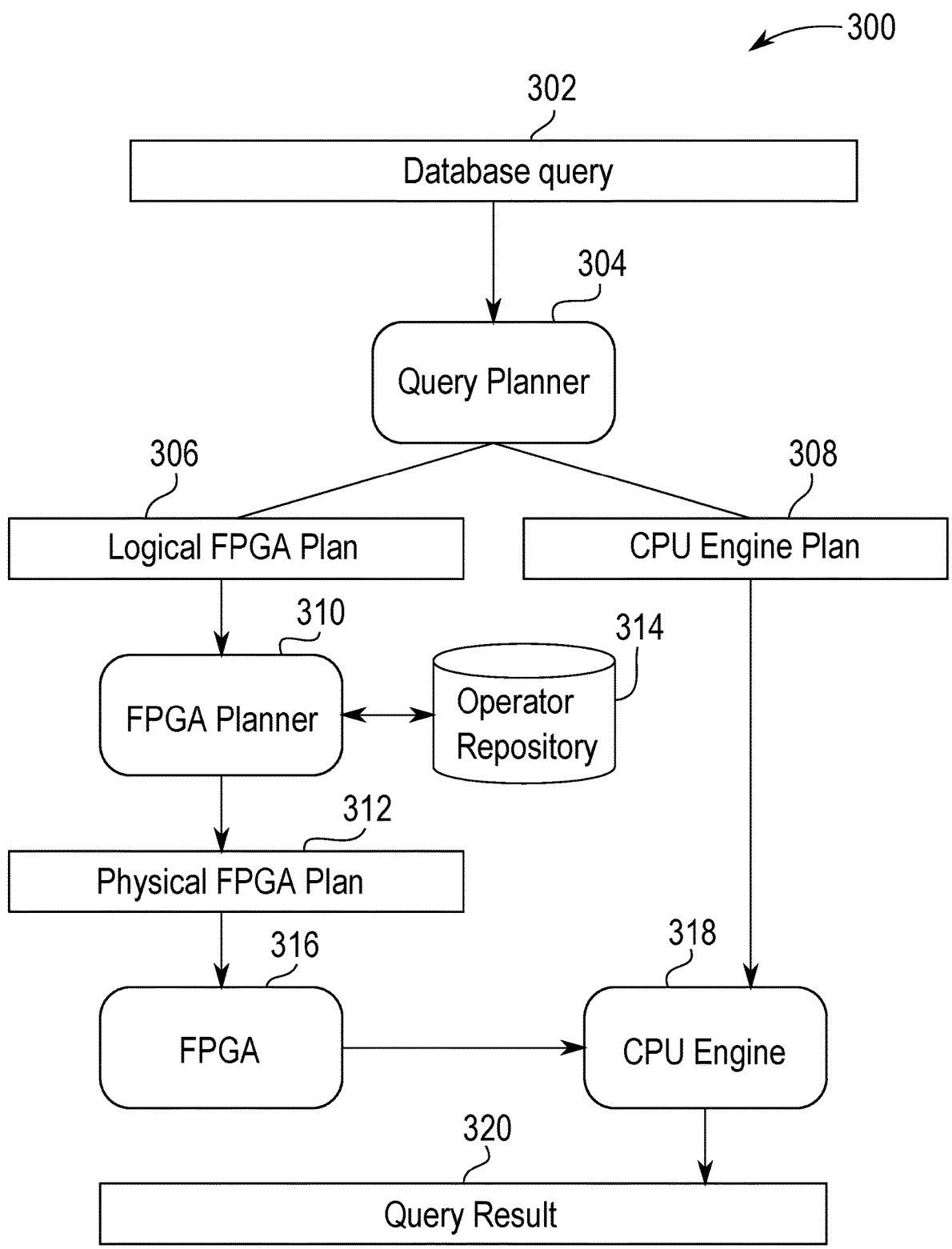
FIG. 3 depicts a schematic of a system architecture for processing a database query in a database system, according to an embodiment of the present disclosure.

Referring now to FIG. 3, a schematic of the architecture of a database system 300 for practicing the proposed method is shown, according to an embodiment of the present disclosure. In a first step the database query 302 is received at the database system 300 and is forwarded to a query planner 304. The query planner 304 transforms the database query 302 into a query plan, which may, for example, include a sequence of database operations necessary to execute the database query 302. In the example depicted in FIG. 3 the at least one programmable integrated circuit 306 is meant to process at least a subset of the database operations necessary to process the database query 302. To this end the query plan created by the query planner 304 consists of a logical plan for the programmable integrated circuit 306 (in this case FPGA) as well as a plan for the central processing unit engine 308. The logical FPGA plan 306 is forwarded to the FPGA planner 310 which transforms the logical FPGA plan 306 into the physical FPGA plan 312. To do so the FPGA planner 310 selects the necessary number of instantiations $N_i$ for every database operation i of the logical FPGA plan 306 as described before. Then the FPGA planner 310 looks up the required implementations of the database operations from the operator repository 314. In addition the FPGA planner 310 may also look up the required multiplexer or de-multiplexer implementations. The FPGA 316 is configured in accordance with the physical FPGA plan 312, while the CPU engine 318 is configured in accordance with the CPU engine plan 308 such that the database query 302 may be processed. While processing the database the FPGA 316 and the CPU engine 318 possibly interact with each other to compute the final query result 320 which is returned in the end.

In practice it may not be expected that an implementation exists in the repository 314 for every database operation and every required number of instantiations $N_i$ of a database operation i. Quite likely implementations of database operations with a number of instantiations $N_i$ of different powers of 2 would be created in practice. Thus, the FPGA planner 310 must choose an implementation of the database operation and corresponding multiplexer or de-multiplexer implementation that matches best the desired number of instantiations $N_i$ of the database operation. If the exact requirement may not be satisfied the achieved degrees are carried back into the calculation in lines 16 and 23 of the Algorithm 1 shown above. If in doubt between too low and too high numbers of instantiations $N_i$ a higher number of instantiations $N_i$ should be favored as under-utilization is to be preferred to over-utilization.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for processing a database query on a database system, the method comprising:
   receiving the database query at the database system;
   determining a sequence of database operations for processing the database query;
   estimating a number of incoming data elements of the database system to be processed for each of the database operations;
   estimating a workload of a programmable integrated circuit of the database system for each of the database operations based on the estimated number of incoming data elements, assuming each of the database operations is performed in a single instantiation;
   selecting a number of instantiations $N_i$ for a database operation i of the sequence of database operations based on the estimated workload of the programmable integrated circuit for the database operation i; and configuring the programmable integrated circuit to execute the determined sequence of database operations, wherein the database operation i is instantiated $N_i$ times.

2. The method of claim 1, wherein the database operations in the sequence of database operations forms a data processing pipeline, and wherein the $N_i$ instantiations of the database operation i are arranged as parallel operations in the data processing pipeline.

3. The method of claim 1, further comprising:

assigning a repository to the programmable integrated circuit, the repository comprising configurations of the programmable integrated circuit used to execute the sequence of database operations, the repository further comprising information assigned to the sequence of database operations, the information comprising a ratio of the number of incoming data elements to a number of outgoing data elements for each of the database operations, and wherein estimating the number of incoming data elements for each of the database operations is conducted using the information successively for each database operation in the sequence of database operations.

4. The method of claim 1, wherein each database operation in the sequence of database operations depends on a preceding database operation in the sequence of database operations.

5. The method of claim 1, wherein the programmable integrated circuit comprises:

determining, for the database operation i, a ratio $Q_i$ of the number of instantiations $N_i$ of the database operation i to the number $N_{i+1}$ of instantiations of a database operation i+1; and inserting a data processing operation between the database operation i and the database operation i+1, the inserted data processing operation distributes a number of outgoing data elements resulting from the $N_i$ instantiations of the database operation i to the $N_{i+1}$ instantiations of the database operation i+1 based on the ratio $Q_i$.

6. The method of claim 1, wherein estimating the workload of the programmable integrated circuit for each of the database operations comprises:

determining a ratio $W_i$ of an estimated number of incoming data elements $r_{i-1}$ to be processed by a database operation i−1 to an estimated number of data elements $r_i$ to be processed by the database operation i;

scaling the workload being based on the ratio $W_i$.

7. The method of claim 6, wherein selecting the number of instantiations $N_i$ for the database operation i comprises:

defining a relative utilization $U_i$ of the database operation i as the product of the ratio $W_i$ and a ratio of a number of instantiations $N_{i-1}$ of the database operation i−1 to the number of instantiations $N_i$ of database operation i; and varying the number of instantiations $N_i$ of the database operation i such that the relative utilization $U_i$, satisfies a threshold.

8. The method of claim 7, wherein the threshold is the relative utilization $U_i$ of a first database operation in the sequence of database operations.

* * * * *